Feb. 13, 1934.  D. D. WILLIAMS  1,946,515
FITTING-UP YOKE
Filed Jan. 13, 1933
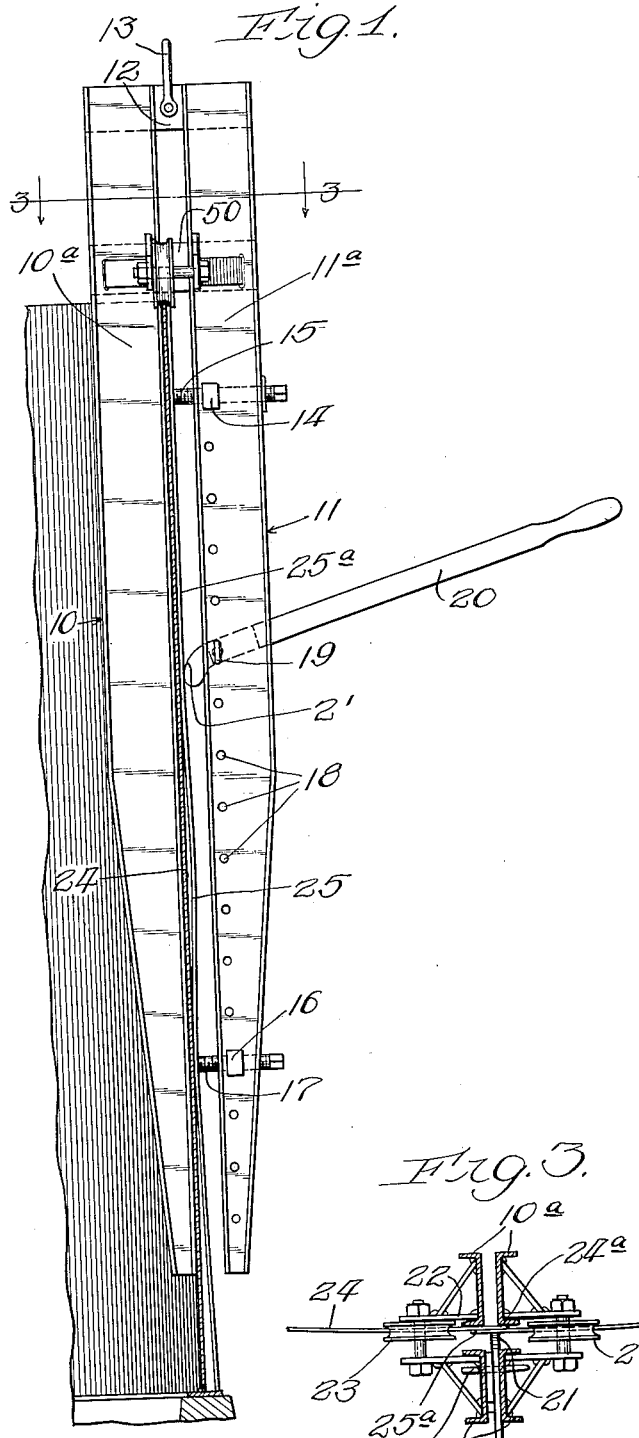
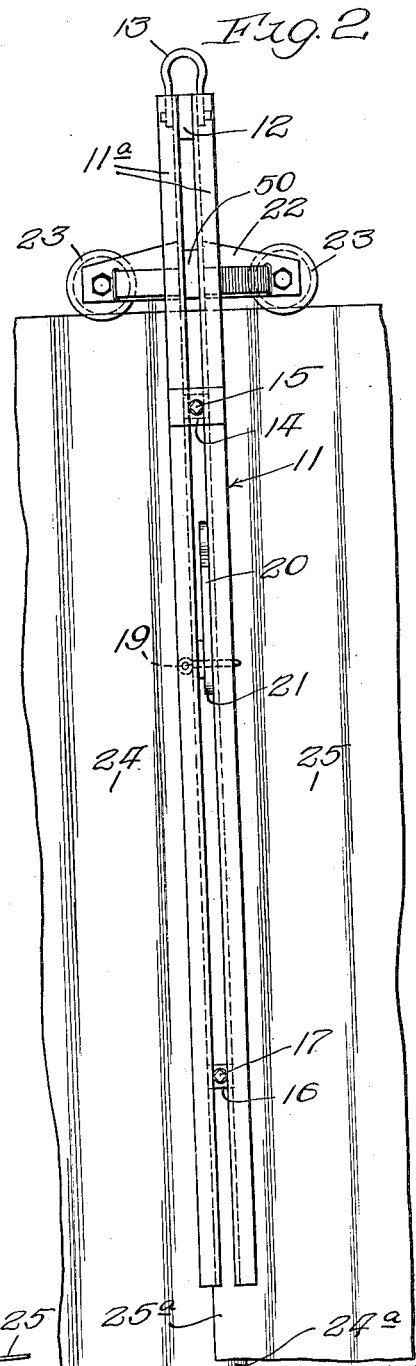

Patented Feb. 13, 1934

1,946,515

UNITED STATES PATENT OFFICE 1,946,515

FITTING-UP YOKE

Djalma D. Williams, Dallas, Tex., assignor to Chicago Bridge & Iron Company, Chicago, Ill., a corporation of Illinois Application January 13, 1933. Serial No. 651,652

1 Claim. (Cl. 113—99)

This invention relates to improvements in fitting-up yoke, and, more especially, such a device to assist in welding a vertical seam between metal plates. The device may be used, for example, in welding the vertical seams of a shell ring of a cylindrical tank and other similar structures.

In making welded cylindrical tanks, for example, difficulty has been encountered in lining up the edges of the plates that are to be welded. For the purpose of illustrating the invention, I have here shown it as applied to a lap weld.

Among the features of my invention is the provision of a yoke adapted to straddle a shell ring over a vertical seam. Means are provided cooperating with one of the legs to force the adjacent edges of the two plates to be welded against the other leg. For example, such means may include screws, levers and the like. When the yoke is in place over a vertical seam, screws on the outside leg are screwed up against the plates forcing them together and over against the inside leg. This insures the vertical seam being in a straight line. By the use of a cam lever, the edges are forced together and tack welded.

Other features and advantages of my invention will appear as I proceed with my specification.

In that form of device embodying the features of my invention shown in the accompanying drawing—

Figure 1 is a view in side elevation; Fig. 2 is a view in front elevation; and Fig. 3 is a view taken as indicated by the line 3 of Fig. 1.

As shown in the drawing, the device in general is in the form of a yoke with two substantially parallel legs adapted to lie adjacent the seam on the inside and the outside of the shell ring when the yoke is straddled. As here shown, the inside leg is indicated in general by 10, and the outside leg, in general, by 11. The inside leg is formed of two channels 10$^a$, 10$^a$ and the outside leg, similarly of two channels 11$^a$, 11$^a$. The channels are suitably fastened together at the top by attachment to a bar 12 which may be provided with a suitable eye or yoke 13 to assist in handling the device.

Between the channels 11$^a$ near the upper end is mounted a nut 14 adapted to receive the clamping screw 15. 16 indicates a similar nut near the lower ends of the channels 11$^a$ embracing the clamping screw 17.

The channels 11$^a$ forming the outer leg are also provided with a series of registering holes 18 adapted to accommodate a pin 19 serving as a fulcrum or axis for the lever 20 carrying the cam 21 at its inner end.

22 indicates a carriage on which the yoke is mounted and provided with grooved wheels 23 resting on the upper edges of the plates 24 and 25 forming the shell ring. By means of this carriage, the yoke is movably supported on the upper edge of the ring and can be moved around from one vertical seam to another.

In the practice of the invention, the yoke is moved to bring it over the vertical seam to be welded. As here shown, for example, this seam may be between the overlapped edges 24$^a$ and 25$^a$ of the plates 24 and 25. The two screws 15 and 17 on the outside leg are then screwed up against the shell plates, forcing them over against the inside leg. Using the cam lever 20, the overlapped edges are then forced together and tack welded. Ordinarily work proceeds from the bottom upwardly, the cam lever being moved upwardly by insertion of the pin 19 in the various holes 18.

50 indicates a bar connecting the two legs of the yoke near the location of the rollers in order to add strength to the apparatus.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

What I regard as new, and desire to secure by Letters Patent, is:

A fitting-up yoke to assist in welding a vertical seam between the plates of a shell ring and the like, including; a carriage for movably supporting the yoke on the upper edge of the shell ring; two substantially parallel legs adapted to lie adjacent said seam on the inside and the outside of the shell ring when the yoke is straddled over the upper edge of said ring; and means cooperating with one of said legs to force the adjacent edges of two plates to be welded into contact with each other and against the other leg.

DJALMA D. WILLIAMS.